US010357923B2

(12) United States Patent
Cauchois et al.

(10) Patent No.: US 10,357,923 B2
(45) Date of Patent: Jul. 23, 2019

(54) METHOD FOR MANUFACTURING A COMPOSITE THERMOPLASTIC PART BY VACUUM INJECTION-COMPRESSION-MOLDING, DEVICE FOR THE IMPLEMENTATION THEREOF AND RESULTING PART

(71) Applicants: Arkema France, Colombes (FR); Institut de Soudure, Villepinte (FR)

(72) Inventors: Jean-Pierre Cauchois, Obersteinbach (FR); Gilles Hochstetter, L'Hay les Roses (FR); Michel Glotin, Saint-cloud (FR)

(73) Assignee: ARKEMA FRANCE, Colombes (FR)

( * ) Notice: Subject to any disclaimer, the term of this patent is extended or adjusted under 35 U.S.C. 154(b) by 885 days.

(21) Appl. No.: 14/437,772

(22) PCT Filed: Oct. 21, 2013

(86) PCT No.: PCT/FR2013/052509
§ 371 (c)(1),
(2) Date: Apr. 22, 2015

(87) PCT Pub. No.: WO2014/064376
PCT Pub. Date: May 1, 2014

(65) Prior Publication Data
US 2015/0273772 A1 Oct. 1, 2015

(30) Foreign Application Priority Data

Oct. 23, 2012 (FR) ..................................... 12 60090

(51) Int. Cl.
| B29C 70/48 | (2006.01) |
| B29B 11/16 | (2006.01) |
| B29C 45/14 | (2006.01) |
| B29C 70/54 | (2006.01) |
| D06M 15/59 | (2006.01) |
| B29K 77/00 | (2006.01) |
| B29K 105/00 | (2006.01) |
| B29K 307/04 | (2006.01) |
| D06M 101/36 | (2006.01) |
| D06M 101/40 | (2006.01) |

(52) U.S. Cl.
CPC .............. *B29C 70/48* (2013.01); *B29B 11/16* (2013.01); *B29C 45/14631* (2013.01); *B29C 70/546* (2013.01); *D06M 15/59* (2013.01); B29K 2077/00 (2013.01); B29K 2105/0002 (2013.01); B29K 2307/04 (2013.01); B29K 2995/004 (2013.01); D06M 2101/36 (2013.01); D06M 2101/40 (2013.01); Y10T 442/20 (2015.04)

(58) Field of Classification Search
CPC ...................................................... B29B 11/16
See application file for complete search history.

(56) References Cited

U.S. PATENT DOCUMENTS

| 3,597,401 | A | * | 8/1971 | McGrath ................ C08G 69/20 528/313 |
| 4,542,174 | A | * | 9/1985 | Godlewski ........... C08K 5/5455 523/508 |
| 5,514,322 | A | * | 5/1996 | Noritake ............... B29C 67/246 264/240 |
| 5,980,796 | A | | 11/1999 | Nussdorfer et al. |
| 6,156,257 | A | * | 12/2000 | Tachi .................... B29B 7/7663 264/102 |
| 2002/0106952 | A1 | * | 8/2002 | Hashizume ....... B29C 45/14221 442/43 |
| 2011/0288194 | A1 | | 11/2011 | Brule et al. |
| 2013/0001817 | A1 | * | 1/2013 | Bessho ............... B29C 44/1209 264/45.3 |
| 2013/0078439 | A1 | * | 3/2013 | Katahira ............... B29C 45/062 428/212 |
| 2014/0316063 | A1 | | 10/2014 | Hochstetter et al. |
| 2015/0165651 | A1 | * | 6/2015 | Yao ......................... C08L 77/02 428/475.5 |
| 2015/0322206 | A1 | * | 11/2015 | Matsumoto .............. C08K 7/06 525/423 |

FOREIGN PATENT DOCUMENTS

| DE | 10 2011 013742 A1 | 9/2012 |
| EP | 2 586 585 A1 | 5/2013 |
| JP | H10-503439 A | 3/1998 |
| JP | 2012-509381 A | 4/2012 |
| WO | WO 2011/118226 A1 | 9/2011 |
| WO | WO 2011/151710 A2 | 12/2011 |
| WO | 2012/123280 A1 | 9/2012 |

OTHER PUBLICATIONS

English Translation of DE102011013742. Klaus, Franken et al. Sep. 13, 2012.*
International Search Report (PCT/ISA/210) dated Apr. 16, 2014, by the European Patent Office as the International Searching Authority for International Application No. PCT/FR2013/052509.

* cited by examiner

*Primary Examiner* — Matthew J Daniels
*Assistant Examiner* — Hana C Page
(74) *Attorney, Agent, or Firm* — Buchanan Ingersoll & Rooney P.C.

(57) ABSTRACT

A method for manufacturing a composite part including a fibrous reinforcement and a thermoplastic polymer matrix, which includes the steps of i) depositing the fibrous reinforcement in a two-part mold having a seal compressible by evacuating said mold having no vent, ii) filling the evacuated mold by injecting, in the molten state, a two-component reactive system made of a reactive thermoplastic prepolymer, the injection being carried out using a device having two distinct compartments for each one of the two reactive components mixed in a static mixer, followed by a compression and compaction of the content of the mold, and iii) removing the part from the mold, without any finishing treatment. Further, a device for implementing said method, to the resulting part and to the use of said method in an "in-mold" assembly method.

13 Claims, No Drawings

METHOD FOR MANUFACTURING A COMPOSITE THERMOPLASTIC PART BY VACUUM INJECTION-COMPRESSION-MOLDING, DEVICE FOR THE IMPLEMENTATION THEREOF AND RESULTING PART

The present invention relates to a specific process for manufacturing a structural or semi-structural composite part, comprising specific molding by injection-compression in a closed two-part mold maintained under vacuum, and also to a specific device for implementing said manufacturing process, to the structural or semi-structural part which results therefrom, and to the specific use of said process for example in combination with an "in-mold" assembly process.

The current processes, used for manufacturing molded composite parts from reactive compositions loaded with long reinforcing fibers, generally require a rework and finishing operation after removal from the mold, thereby increasing the cycle time for the final part and considerably reducing productivity, in addition to the fact that the porosity of said parts remains relatively high, thus affecting the mechanical performance levels of these parts when they are used. In particular, in the case of motor vehicle parts, it is essential for the molded part to be capable of withstanding treatment under cataphoresis conditions without any problem.

The present invention proposes to remedy these drawbacks by providing a novel process which is specific through the use of a novel device for implementing this process.

The problem to be solved is therefore that of the rapid manufacturing of a structural or semi-structural, final composite part requiring no rework and/or machining operation for finishing after removal from the mold and having good mechanical strength and allowing the use of reactive thermoplastic prepolymers having a melt viscosity at the molding temperature of less than 50 Pa·s, preferably less than 5 Pa·s and more preferentially less than 1 Pa·s. More particularly, in the case of motor vehicle parts, the part must be capable of passing through cataphoresis without any particular difficulty or problem.

The solution of the present invention proposes an injection-molding device system which comprises a two-part mold, one fixed and the other mobile and separated by a compressible seal, thus forming a molding cavity that is leaktight under vacuum. This allows rapid injection of the liquid resin and makes it possible to dispense with the presence of a vent, thereby making it possible to avoid the formation of a sprue requiring a machining operation after the part has been removed from the mold: it is a process which allows a "net shape" molded part to be obtained, without any need for finishing or machining for its final use.

It is possible for the two faces of the mold to move with respect to one another after the resin has been injected into the mold. This allows compaction of the combination consisting of the molten resin+fiber and finally makes it possible to obtain a composite which has a very low degree of porosity, thereby providing the molded part with good mechanical strength. This compression is carried out by means of an additional pressure reduction, corresponding to a pressure of the order of 1 mbar, in particular less than 1 mbar, applied to the faces of the mold.

The noncompacted (i.e. noncompressed) leaktight molding cavity allows easy creep of the material, reducing the injection time, which is an essential advantage of the invention. The compacting or compression due to the closing of the mold (under the effect of the pressure reduction created) ensures both complete filling of said molding cavity and also transverse creep of the material with respect to the reinforcement, all this in a cavity at a pressure of about 1 mbar, in particular less than 1 mbar. Said mold has a leaktight closure under vacuum and comprises no vent and is fed directly by an injection device through a feed at the level of the outlet of the head of a static mixer as described for the injection system below.

The presence of the vacuum, the absence of insert and the possibility of a final compaction of the resin+fiber combination make it possible to inject only the amount of resin required and sufficient to make the part, which is a source of savings for the process and which is an additional advantage for the process according to the present invention.

The possibility of compaction also makes it possible to use thermoplastic resins which are more viscous in the molten state than the thermosetting resins conventionally used in "LCM" (liquid composite molding) processes such as RTM (typically 1 to 50 Pa·s compared with less than 1 Pa·s for thermosetting RTM). In addition, the pressure for closing said mold (by pressure reduction) makes it possible to use molds made of lighter and more practical materials which are cheaper to manufacture.

The resin injection system allows the use of a two-component reactive system and consists of two independent networks in which the two compounds circulate independently of one another and therefore without time limitation (no pot life). The system also has a static mixing chamber (for example a static mixer head chamber) controlled by a mechanical system allowing rapid mixing of the two constituents with a mixing time of less than 2 minutes, preferably less than 1 minute, more particularly less than 10 seconds, just before injection into the mold. It is obvious that the residence time in the head of the static mixer (two-component mixing time), before the injection into said mold, is adjusted according to the reactivity of said two-component system so as to avoid polymerization and congealing in said mixture before injection into the specific molding system.

This system allows the use of a reactive thermoplastic prepolymer, in particular a semi-aromatic or semi-cycloaliphatic polyamide, and of a chain extender, which is a means for obtaining a part having good mechanical properties since the final polymer formed after the reaction of the prepolymer and the chain extender would have a high Tg. In one preferred version, the polymer is semi-crystalline and has a crystallization temperature above 200° C., preferably above 220° C., which allows the molded part to pass through a cataphoresis process.

In addition, the use of a polyamide with a high Tg (HT PA) and of an injection process which operates at high temperature, typically from 180° C. to 400° C., preferably from 200° C. to 300° C., makes it possible to use rapid reactive systems, typically with a polymerization in less than 5 minutes, preferably in less than 2 minutes, even more preferentially in less than 1 minute, and finally to reduce the molding cycle times.

The system makes it possible to use a preform constituting the long reinforcing fiber network with a length-to-diameter L/D aspect ratio greater than 1000 and preferably greater than 2000.

Overmolding of the preform preimpregnated with resin, with a molten polymer, is possible, so as to be able to manufacture parts of complex shape having, for example, fixing tabs or inserts. The polymer used in overmolding (in the form of granules) will preferably be loaded with short or long reinforcing fibers (L/D less than 1000), for example made of glass or carbon, and it is of the same chemical nature as (or compatible with) the resin (or two-component reactive composition) used for impregnation of the network of continuous fibers. In particular, said overmolding polymer is chemically and physically compatible so as to provide good adhesion between the overmolded part and the composite part comprising continuous fibers and, in the case where a semi-crystalline resin is used for manufacturing the composite part comprising continuous long fibers, to ensure that the composite+overmolded parts combination passes through cataphoresis.

The present invention, by virtue of its originality, has, compared with the current prior art, the associated advantages as set out below:

Melt molding process, which is therefore suitable for thermoplastics, and rapid since it allows the use of prepolymers, which limits the duration of the polymerization step and does not pose any problem of the residual monomer content posed by the processes starting from monomers, which avoids post-curings or excessive polymerization times, which also allows removal from the mold before the end of the polymerization, in particular for semi-crystalline prepolymers, preferably polyamides, having a high melting point. Said process is also rapid because the injection system operates at high temperature and allows the use of prepolymer of HT PA type: this type of prepolymer has rapid polymerization kinetics since it polymerizes at high temperature and, in addition, the resulting polymer has a high Tg, which makes it possible to obtain good mechanical properties for the composite, and it is preferably semi-crystalline and has a crystallization temperature above 200° C. and, as a result, allows the molded composite part to pass through cataphoresis. This type of process does not exist at the current time.

Thermoplastic molding and overmolding process making it possible to obtain a final part which does not require retouching after removal from the mold, which simultaneously has a complex shape and good mechanical resistance and which makes it possible to use only the amount of resin required (premetering) and sufficient for impregnation of the fibers. This type of process does not exist at the current time.

More particularly, the solution of the present invention is of more particular interest for parts in the motor vehicle field, more particularly complex parts, which are resistant under conditions of passage through cataphoresis, and may concern more particularly complex parts such as a "body in white" of a car, according to the common terms used in the motor vehicle industry. The doors, engine and bodywork will be attached to this part, said part combining composites and metals. It is indeed the assembly combining composites and metals which thus undergoes the treatment by cataphoresis.

The final uses of the parts according to the invention, obtained using the process of the invention and/or the device described according to the present invention, concern more generally applications in the following fields: the motor vehicle industry, road transport (trucks), the railroad industry, the maritime industry, aeronautics, wind power, the solar (thermal) industry, including solar power stations, the space industry, photovoltaics, the construction industry and civil engineering, urban furniture and equipment, signage, sports and leisure.

A first subject of the invention therefore relates to a specific process for processing or manufacturing said structural or semi-structural composite part, comprising the steps of depositing the fibrous reinforcement in a specific mold under vacuum having no vent, then of filling under vacuum said mold by injecting onto said reinforcement a two-component reactive composition in the molten state, based on a thermoplastic prepolymer, by injection and using a specific injection device having two compartments for each of the two components, with mixing of said components in a static mixer, filling being followed by an additional pressure reduction allowing compacting of the injected material by the pressure exerted on the two parts of said mold and by the compression of a seal separating the two parts of said mold, and, finally, removing said part from the mold without any additional need for finishing or machining.

The second subject of the invention relates to a specific device comprising a particular injection device and a particular molding device combined in this same device of the invention and allowing the implementation of said process which is the first subject of the invention.

The invention also covers a structural or semi-structural composite part which can be obtained by means of the process of the invention, in particular having no finishing treatment after removal from the mold. Indeed, this part, on removal from the mold, has no vent-associated sprue requiring additional machining and finishing thereof due to the fact that the process uses a mold with no vent since the system operates under vacuum.

Finally, the invention covers the use of the process of the invention insofar as it is very suitable and flexible in the manufacture of complex and multicomponent composite parts which can comprise parts made of composite, of common plastic and of metal, in an "in-mold" assembly process (the term "in-mold" being commonly used for this type of process), i.e. a process in the mold and in particular in the same mold suitable for this use.

Therefore, the first subject of the invention, in a more detailed manner, relates to a process for manufacturing a structural or semi-structural composite part which may be of complex shape, comprising a fibrous reinforcement and a thermoplastic polymer matrix, preferably based on polyamide, characterized in that it comprises the following steps:

i) depositing said fibrous reinforcement, which may be in the form of a preform, in a mold comprising two parts, one part being fixed and one mobile, with leaktight closure of said mold by means of a seal compressible by placing said mold under vacuum by means of a vacuum device, the partial pressure in the mold ranging from 1 to 10 mbar, said mold having no vent, ii) filling said closed mold thus under vacuum by injecting, in the molten state, onto said reinforcement in the dry state a pre-metered amount, just necessary to obtain the final part, of a two-component reactive system (also referred to as two-component reactive composition) which is the precursor of said thermoplastic (matrix) polymer, based on a reactive thermoplastic prepolymer, preferably on a reactive polyamide prepolymer, it being possible for the mold to be maintained under isothermal conditions at a temperature below the injection temperature and with said injection being carried out using an injection device comprising two distinct compartments for each of the two reactive components in the molten state, said reactive components being mixed before injection in the chamber of a static mixer head with a residence time in said chamber of less than 2 minutes, preferably less than 1 minute and more preferentially less than 10 seconds, at a temperature which can range from 180° C. to 400° C., preferably from 200° C. to 300° C., with impregnation of said fibrous reinforcement and simultaneous reaction following the impregnation of said two-component reactive system under a pressure of less than 1 mbar, the creep of the resin through the reinforcement being accompanied by a compacting pressure at the end of injection ensuring complete filling of said mold, with no vent, iii) removing said part from the mold without any finishing treatment.

According to one particular option, it also comprises, after step ii), a step of overmolding by separate injection onto the part formed and still in the mold of step ii), of a thermoplastic polymer in the molten state comprising short or long reinforcing fibers with an L/D aspect ratio of less than 1000, said thermoplastic polymer being used here in the form of granules, before it is melted, and already containing said reinforcing fibers, said thermoplastic being compatible with the polymer resulting from said reactive prepolymer-based two-component reactive system.

According to one particular version of said process, the part of step ii), without overmolding or with overmolding (the overmolded part) as defined above, can be a part, more specifically can be an integral part, of a complex part comprising other constituent parts which are attached to one another and of different nature and which are chosen from plastic and/or metallic parts, and said process is part (is a step) of a process for molding by "in-mold" assembly of said constituent parts, in the same mold or a different mold, so as to form said final complex part.

According to one variant of the process of the invention, said fibrous reinforcement may be in the form of a preform produced in a step prior to the molding of the composite part by specific molding-forming of said preform and, optionally, it being possible for this preform to be produced in the same mold by compression-molding of said reinforcement pre-impregnated with a polymer binder compatible with the polymer resulting from said prepolymer-based two-component reactive system, or with the same two-component reactive system, or it being possible for said preform to be produced by thermoforming in a different mold.

Preferably, the viscosity of said two-component reactive system as injected at the outlet of the head of said static mixer is less than 50 Pa·s and preferably less than 5 Pa·s and more preferentially less than 1 Pa·s.

Regarding the two-component reactive system according to a first option, it comprises at least one reactive thermoplastic prepolymer, preferably reactive polyamide prepolymer, bearing two identical functions (not reactive with one another) and at least one nonpolymeric chain extender bearing two identical functions (not reactive with one another) reactive (only) with those of said reactive prepolymer, and preferably by polyaddition, which means without elimination of reaction by-products.

According to a second option, said two-component reactive system comprises at least one first reactive prepolymer, preferably reactive polyamide prepolymer, bearing two identical functions (not reactive with one another) and at least one second reactive prepolymer, preferably reactive polyamide prepolymer, bearing two identical functions (not reactive with one another) reactive (only) with those of said first reactive prepolymer, by polyaddition or by polycondensation.

According to one preferred version of the process of the invention, said polymer of said thermoplastic matrix is semi-crystalline and has a glass transition temperature Tg above 90° C., preferably above 100° C., more preferentially above 120° C., and a melting temperature Tm below 320° C., preferably Tm below 280° C., more preferentially Tm being between 200 and 280° C., in particular of semi-aromatic and/or semi-cycloaliphatic structure, which means comprising an aromatic and/or cycloaliphatic structure, preferably being a semi-crystalline polyamide. In this case, the corresponding thermoplastic prepolymer in said two-component reactive composition (or two-component reactive system) will also be semi-crystalline and of the same structure, preferably being a semi-crystalline reactive polyamide prepolymer.

The number-average molecular weight Mn of said final thermoplastic polymer of the thermoplastic matrix of said composite material is preferably in a range of from 10000 to 40000, preferably from 12000 to 30000. Its structure is a result of the two-component reactive composition (two-component reactive system) which is the precursor of the thermoplastic polymer of said thermoplastic matrix. The weight Mn of the corresponding reactive prepolymer used is at least two times lower than that of said final polymer of the thermoplastic matrix.

The number-average molecular weight Mn of the thermoplastic reactive prepolymers, preferably polyamide prepolymers, which are part of said two-component reactive system (or two-component reactive composition) which is the precursor of said thermoplastic polymer of the matrix, can range from 500 to 10000, preferably from 1000 to 6000.

Said value Mn is determined by calculation from the titration (such as potentiometric titration) of the end functions borne by said prepolymer and the functionality of said prepolymer determined from the material balance and the functionality of the reactants involved in the preparation of said reactive prepolymer.

Said two-component reactive system (or the two-component reactive composition denoted herein p)) and which is the precursor of said thermoplastic polymer of said matrix can be defined according to two options, p1) being based on two bifunctional reactive thermoplastic prepolymers p11) and p12) respectively, which are preferably semi-crystalline and more particularly polyamide reactive prepolymers, with p11) bearing two identical reactive functions X' and with p12) bearing two functions Y' which are also identical, and with the two functions X' and Y' being reactive with one another.

According to a second preferred option, said precursor composition is defined according to p2) based on a thermoplastic bifunctional reactive prepolymer p21), which is preferably semi-crystalline, in particular a polyamide reactive prepolymer, bearing two identical reactive functions X, and on a nonpolymeric chain extender p22), preferably having a molecular weight of less than 500 and in particular less than 400, with p22) bearing two identical reactive functions Y, with said function X of said prepolymer p21) being reactive with said function Y of said extender p22).

The preferred functions borne by the reactive prepolymers of said two-component reactive system p) as defined according to p11), p12) or p21) are selected from: amine (represented by $NH_2$, which represents both primary amine and secondary amine), carboxy (represented by $CO_2H$) or hydroxyl (represented by OH), more preferentially amine and carboxy.

Said function Y of said extender p22) can be selected as follows according to the function X of said prepolymer p21):
when X is carboxy, Y is chosen from: oxazoline, oxazine, imidazoline, aziridine or epoxy;

when X is amine, Y is chosen from: maleimide, epoxy, blocked isocyanate, oxazinone, oxazolinone, caprolactam or carboxylic anhydride, and in the latter case in particular said extender can be chosen from cyclic aromatic and/or cycloaliphatic anhydrides.

Examples of extenders p22) suitable for the invention are mentioned below. The part of the extender p22) bearing the two functions (or groups) Y could be represented by a diradical -A'-, with said extender having an overall formula Y-A'-Y.

More particularly, when said extender Y-A'-Y corresponds to a function Y chosen from oxazinone, oxazolinone, oxazine, oxazoline or imidazoline, in this case, in the chain extender represented by Y-A'-Y, A' can represent an alkylene such as —$(CH_2)_m$— with m ranging from 1 to 14 and preferably from 2 to 10, or A' can represent a cycloalkylene and/or an arylene which is substituted (alkyl) or unsubstituted, for instance benzenic arylenes, such as o-, m- or p-phenylenes or naphthalenic arylenes, and preferably A' can be an arylene and/or a cycloalkylene. This remains valid when Y is epoxy.

In the case of carbonyl- or terephthaloyl- or isophthaloyl-biscaprolactam as chain extender Y-A'-Y, the preferred conditions prevent the elimination of by-product, for instance caprolactam, during said polymerization and molding in the molten state.

In the case where Y is a blocked isocyanate function, this blocking can be obtained with blocking agents for the isocyanate function, for instance epsilon-caprolactam, methyl ethyl ketoxime, dimethylpyrazole or diethyl malonate.

Likewise, in the case where the extender is a dianhydride which reacts with a prepolymer p21) bearing X=amine, the preferred conditions prevent any formation of imide ring during the polymerization and molding (or processing) in the molten state.

For X=amine, the Y group is preferably chosen from: blocked isocyanate, oxazinone and oxazolinone or epoxy, more preferentially oxazinone and oxazolinone, with, as radical, A' being as defined above.

As examples of chain extenders bearing oxazoline or oxazine reactive functions Y suitable for implementation of the invention, reference may be made to those described under references "A", "B", "C" and "D" on page 7 of application EP 0 581 642, and also to their preparation processes and their modes of reaction which are set out therein. "A" in said document is bisoxazoline, "B" is bisoxazine, "C" is 1,3-phenylenebisoxazoline and "D" is 1,4-phenylenebisoxazoline.

As examples of chain extenders with an imidazoline reactive function Y that are suitable for the implementation of the invention, reference may be made to those described ("A" to "F") on pages 7 to 8 and table 1 of page 10, in application EP 0 739 924 and also to their preparation processes and their modes of reaction which are set out therein.

As examples of chain extenders with a reactive function Y=oxazinone or oxazolinone which are suitable for the implementation of the invention, reference may be made to those described under references "A" to "D" on pages 7 to 8 of application EP 0 581 641, and also to their preparation processes and their modes of reaction which are set out therein.

As examples of suitable oxazinones (ring comprising six atoms) and oxazolinone (ring comprising five atoms) Y groups, mention may be made of the Y groups derived from: benzoxazinone, oxazinone or oxazolinone, it being possible for A' to be a single covalent bond with respective corresponding extenders being: bis-(benzoxazinone), bisoxazinone and bisoxazolinone.

A' can also be a C1 to C14, preferably C2 to C10 alkylene, but A' is preferably an arylene and more particularly it can be a phenylene (substituted with Y in positions 1,2 or 1,3 or 1,4) or a naphthalene radical (disubstituted with Y) or a phthaloyle (iso- or terephthaloyle) or A' can be a cycloalkylene.

For the Y functions chosen from oxazine (6-membered ring), oxazoline (5-membered ring) and imidazoline (5-membered ring), the A' radical may be as described above with it being possible for A' to be a single covalent bond and with the respective corresponding extenders being: bisoxazine, bisoxazoline and bisimidazoline. A' may also be a C1 to C14, preferably C2 to C10, alkylene. The A' radical is preferably an arylene and, more particularly, it may be a phenylene (substituted with Y in positions 1,2 or 1,3 or 1,4) or a naphthalene radical (disubstituted with Y) or a phthaloyle (iso- or terephthaloyle), or A' may be a cycloalkylene.

In the case where Y=aziridine (nitrogenous heterocycle comprising three atoms equivalent to ethylene oxide with the ether —O— being replaced with —NH—), the A' radical may be a phthaloyle (1,1'iso- or terephthaloyle) with, as example of extender of this type, 1,1'-isophthaloylbis(2-methylaziridine).

The presence of a catalyst of the reaction between said prepolymer p21) and said extender p22) at a content ranging from 0.001 to 2%, preferably from 0.01 to 0.5%, relative to the total weight of two mentioned coreactants, can accelerate the (poly)addition reaction and thus shorten the production cycle. Such a catalyst can be chosen from: 4,4'-dimethylaminopyridine, p-toluenesulfonic acid, phosphoric acid, NaOH and optionally those described for a polycondensation or transesterification, as described in EP 0 425 341, page 9, lines 1 to 7.

According to a more specific case of the choice of said extender, A' may represent an alkylene, such as —$(CH_2)_m$— with m ranging from 1 to 14 and preferably from 2 to 10, or represents an alkyl-substituted or unsubstituted arylene, such as benzenic arylenes (such as o-, m- or p-phenylenes) or naphthalenic arylenes (with arylenes: naphthylenes). Preferably, A' represents a substituted or unsubstituted arylene which can be benzenic or naphthenic. Preferably, A' represents an arylene which may be substituted or unsubstituted benzenic or naphthenic.

The reactive prepolymers, as defined above according to p11), p12) or p21), may be of amorphous or semi-crystalline structure, the semi-crystalline structures being preferred. With regard to the chemical structure of these prepolymers (and consequently of the polymers of the thermoplastic matrix), these prepolymers can be selected, for example, from reactive prepolymers based on: homopolymers or copolymers of polyamides, including copolymers of polyamide-ethers, polyamide-esters, polyesters, polyurethanes, polyureas, polyaryl ethers, polyaryl ether ketones (PAEKs), polyether ether ketones (PEEKs), polyether ketone ketones (PEKKs), polyether ketone ether ketone ketones (PEKEKKs) and polyimides.

The thermoplastic reactive prepolymers as defined according to p11), p12) or p21) are by definition bifunctional, which results, after chain elongation reaction, in a linear polymer by definition (thermoplastic).

These prepolymers can be prepared via conventional routes such as limited (controlled) polyaddition or polycondensation so as to form oligomers or prepolymers from bifunctional reactive monomers, bearing said functions X' or Y' or X as defined above or other initial reactive functions post-modified to X', Y' or X as defined above for, respectively, prepolymers p11), p12) and p21).

More particularly, in the preferred case of polyamide reactive prepolymers, they can be obtained, for example, by polycondensation between a diamine and a diacid with excess of one of the two monomers which imposes its end functionality, like the molecular weight. Amino acids or lactams may be present in addition to the two diamine and diacid monomers. In the case of a two-component reactive composition of type p1), said prepolymer p11) can bear two identical amine or carboxy functions X' and the second polyamide prepolymer p12) will bear two functions Y' which are reactive only with the functions X'. In the case of a composition p2), the choice of the function Y and of the corresponding extender p22), with respect to the functions X of the polyamide prepolymer p21), has already been described above.

With regard to the fibrous reinforcement of said thermoplastic composite material, it is preferably based on long reinforcing fibers having an L/D (length-to-diameter) aspect ratio much greater than 1000 and preferably greater than 2000.

The fibers may be continuous and present in the form of an assembly which may be a preform. They may be in the form of a unidirectional (UD) or multidirectional (2D, 3D) reinforcement. In particular, they may be in the form of cloths, fabrics, sheets, strips or plaits and can also be cut up, for example in the form of nonwovens (mats) or in the form of felts.

These reinforcing fibers can be chosen from:
mineral fibers, these have high melting temperatures Tm' above the processing temperatures,
polymeric or polymer fibers, having a melting temperature Tm' or, failing the Tm', a glass transition temperature Tg', much higher than the processing temperatures,
or mixtures of the abovementioned fibers.

More particularly, these reinforcing fibers can be chosen as follows:
the mineral fibers can be chosen from: carbon fibers, carbon nanotube fibers, glass fibers, in particular of E, R or S2 type, boron fibers, ceramic fibers, in particular silicon carbide fibers, boron carbide fibers, boron carbonitride fibers, silicon nitride fibers, boron nitride fibers, basalt fibers, fibers or filaments based on metals and/or alloys thereof, fibers based on metal oxide, such as $Al_2O_3$, metalized fibers, such as metalized glass fibers and metalized carbon fibers, or mixtures of the abovementioned fibers, and
the polymer or polymeric fibers, under the abovementioned condition, are chosen from:
fibers of thermoplastic polymers, more particularly chosen from: polyethylene terephthalate (PET), polybutylene terephthalate (PBT),
fibers of polyamides corresponding to one of the formulae: 6, 11, 12, 6.10, 6.12, 6.6, 4.6,
fibers of aramids (such as Kevlar®) and aromatic polyamides, such as those corresponding to one of the formulae: PPD.T, MPD.I, PAA and PPA, with PPD and MPD being respectively p- and m-phenylenediamine, PAA being polyarylamides and PPA being polyphthalamides,
fibers of block copolymers of polyamide, such as polyamide/polyether, or fibers of polyaryl ether ketones (PAEKs) such as polyether ether ketone (PEEK), polyether ketone ketone (PEKK) or polyether ketone ether ketone (PEKEKK).

The preferred reinforcing fibers are long fibers chosen from: carbon fibers, including metalized carbon fibers, glass fibers, including metalized glass fibers of E, R or S2 type, fibers of aramids (such as Kevlar®) or of aromatic polyamides, fibers of polyaryl ether ketones (PAEKs), such as polyether ether ketone (PEEK), fibers of polyether ketone ketone (PEKK), fibers of polyether ketone ether ketone (PEKEKK), or mixtures thereof.

The fibers more particularly preferred are chosen from: glass fibers, carbon fibers, ceramic fibers and aramid (such as Kevlar®) fibers, or mixtures thereof.

Said fibers can represent contents of 40% to 70% by volume and preferably of 50% to 65% by volume of said composite material.

The assembly of fibers may be random (mat), unidirectional (UD) or multidirectional (2D, 3D or the like). Its grammage, i.e. its weight per square meter, can range from 100 to 1000 $g/m^2$, preferably from 200 to 700 $g/m^2$.

The most preferred fibers are selected from glass fibers, carbon fibers, ceramic fibers and aramid fibers, or mixtures thereof.

In addition to said reinforcing fibers, the composition of said thermoplastic composite of the process according to the invention may comprise other fillers or additives.

Among the suitable fillers, mention may be made, for example, of: inorganic or organic fillers, such as carbon black, carbon nanotubes (CNTs), carbon nanofibrils, glass beads or powder and ground recycled polymers in powder form.

Among the suitable additives, mention may be made of: additives which absorb in the UV or IR range so as to allow welding of the composite obtained, by (UV or IR) laser technology, and heat stabilizers chosen from antioxidants of sterically hindered phenol or sterically hindered amine type (HALS). The function of these stabilizers is to prevent thermal oxidation and subsequent photooxidation and degradation of the matrix polyamide of the composite obtained.

More particularly, in the case of manufacturing an overmolded part as described above, said overmolding thermoplastic polymer is semi-crystalline and has a melting temperature above 200° C. and is preferably a semi-crystalline polyamide. As described above, said overmolding polymer is compatible with the matrix thermoplastic polymer of the thermoplastic composite.

The second subject of the invention is a manufacturing device which may be a set of combined apparatuses or machines or a manufacturing unit or workshop which allows the implementation of the process as defined above according to the invention, said device comprising:

a) at least one melt injection device which allows the injection, in a temperature range of from 180° C. to 400° C., and preferably from 200° C. to 350° C., more preferentially from 200° C. to 300° C., of a two-component reactive system (also referred to as two-component reactive composition), said device comprising two separate feed compartments, each equipped with a heating and temperature-regulating system (said temperature being in said ranges mentioned above) and with a feed pump, each feeding the chamber of a head of a static mixer which also has a heating and regulating system, said mixer head feeding, at at least one injection point, a molding device b) as defined below;

b) a vacuum compression-molding device comprising a mold composed of two parts, one fixed and the other mobile, separated from one another by a compressible seal, said seal preferably being based on a fluoroelastomer or an elastic metallic seal, thus forming a leaktight molding cavity (leaktight cavity), said device being equipped with a system for heating and regulating under isothermal conditions at a temperature below the injection temperature and with a system for placing said noncompacted (or noncompressed) leaktight cavity under vacuum, allowing creep of the injected material, and the compacting (or compression) generated on closing the mold under vacuum, ensures both complete filling of said cavity and also the transverse creep of the material with respect to the reinforcement, all this in said cavity at a pressure below 1 mbar, said mold having a leaktight closure under vacuum and comprising no vent and being fed directly by said injection device a) through a feed at the level of the outlet of the head of said static mixer.

Said injection device a) with the two distinct compartments may be an appropriate two-component reactive injection machine, such as a machine of RIM type with adjustment of the parameters to a two-component reactive system based on thermoplastic prepolymers having a suitable melt viscosity which is less than 50 Pa·s.

The static mixer is preferably a mixer which allows rapid and efficient (intimate) mixing of two reactive components without allowing in situ reaction with a residence time in the chamber in the head of said mixer of about a few tens of seconds and preferably less than 10 seconds.

This manufacturing device may comprise at least one second injection device for a single-component system in order to allow overmolding with a thermoplastic in the molten state loaded with short or long fibers having an aspect ratio of less than 1000, this second injection device being directly connected to the same molding device b), in particular via at least one second injection point in said molding device b), in particular said mold, it being possible for said thermoplastic to be fed into said injection device in the form of granules loaded with said fibers, optionally by means of a feed hopper. This second injection device may be a single-component injection machine or an extruder.

Another subject of the present invention relates to a structural or semi-structural composite part which can be obtained by means of the process of the invention as described above or by using the device of the invention as described above, in particular said part comprising no residual molding sprue and being able to be used after removal from the mold without any finishing treatment. More particularly, said part is "net-shape" according to a term common in the molding industry, which means requiring no particular machining or finishing before final use. This is linked to the specific conditions for manufacturing and in particular for molding in a mold operating under vacuum and, as a result, with no need for a vent which usually (when it is present) requires, upon removal from the mold, the removal of the sprue formed, associated with this vent, by machining and additional finishing. This is an important difference in final structure and a significant additional advantage compared with the prior art in this field. More particularly, said part has a preferably polyamide, thermoplastic polymer matrix resulting from a two-component reactive composition comprising, as first reactive component A1): at least one reactive thermoplastic prepolymer, preferably reactive polyamide prepolymer, which is in particular semi-crystalline, bearing two identical functions (not reactive with one another), and, as second reactive component A2) according to a first option for A2): at least one nonpolymeric chain extender comprising two identical functions (not reactive with one another) reactive with those of said reactive prepolymer, preferably by polyaddition, or as second option for A2), at least one second reactive prepolymer, preferably reactive polyamide prepolymer, which is in particular semi-crystalline, bearing two identical functions (not reactive with one another) reactive with those of said first reactive prepolymer A1), by polyaddition or by polycondensation, in particular A2) being defined according to the first option for A2).

According to one particularly preferred option, said reactive prepolymer A1) is a polyamide, which is preferably semi-aromatic and/or semi-cycloaliphatic, in particular semi-crystalline and bears two identical functions (not reactive with one another).

Said part of the invention, which may be structural or semi-structural, can be used for various final applications, in particular in the following fields: the motor vehicle industry, road transport, as parts for trucks, the railroad industry, the maritime industry, aeronautics, photovoltaics, the solar (thermal) industry, in particular solar power station components, wind power, the space industry, the construction industry and civil engineering, urban furniture and equipment, signage, sports and leisure.

More particularly, said part is a motor vehicle part chosen from or for a body in white, apron, tailgate, floor, side wall, roof, spring bar, front, rear, side crash box, door structure and fenders, and more particularly said part is capable of being subjected to cataphoresis.

Therefore, the present invention covers in particular structural or semi-structural parts for motor vehicles, which can be obtained by means of the manufacturing process or by use of the manufacturing device according to the invention and as described above and having the ability to be subjected to cataphoresis.

According to one particular and preferred option, the structural or semi-structural part of the invention may be an integral part of a complex part obtained by "in-mold" assembly in the same molding device b) or a different device of several constituent parts, among which are plastic and/or metallic parts, based on a two-component reactive system, based on thermoplastic reactive prepolymers, in particular on polyamide, as reactive prepolymer.

According to one preferred option, said structural or semi-structural composite part is based on a thermoplastic matrix which is a polyamide and said two-component reactive system, from which said thermoplastic matrix is derived, comprises at least one reactive polyamide prepolymer, which is preferably semi-aromatic and/or semi-cycloaliphatic, in particular semi-crystalline, bearing two identical functions (not reactive with one another) and at least one nonpolymeric chain extender bearing two identical functions (not reactive with one another) which can react with those of said reactive polyamide.

According to one particular variant, said part is overmolded and therefore comprises a thermoplastic polymer loaded with short or long fibers having an L/D aspect ratio of less than 1000, overmolded onto said part based on said two-component reactive system, said overmolding thermoplastic polymer being compatible with said polymer resulting from the two-component reactive system based on thermoplastic reactive prepolymer.

Finally, also part of the present invention is the use of the process or of the device as defined according to the invention above, in the manufacturing of a complex and multicomponent composite part by "in-mold" assembly.

Likewise, the use of the specific process and of the specific device as defined above according to the invention, for the manufacturing of "net-shape" structural or semi-structural composite parts, with no need, for the use thereof, for additional machining or finishing after removal from the mold, is part of the invention.

Methods for Determining the Characteristics Mentioned

The melt viscosity of the prepolymer or of the precursor composition is measured according to the reference manual of the constructor of the measuring instrument used, which is a Physica MCR301 rheometer, under nitrogen flushing at the temperature given under a shear of $100\ s^{-1}$, between two parallel planes 50 mm in diameter.

The Mn of the thermoplastic polymer or prepolymer is determined from the titration (quantitative determination) of the end functions according to a potentiometric method (direct quantitative determination for $NH_2$ or carboxy) and from the theoretical functionality which is 2 (in end functions) for linear prepolymers and polymers prepared from only bifunctional monomers.

The glass transition temperature Tg of the thermoplastic polymers used is measured using a differential scanning calorimeter (DSC), after a 2nd heating pass, according to standard ISO 11357-2. The heating and cooling rate is 20° C./min.

The melting temperature Tm and the crystallization temperature Tc are measured by DSC, after a 1st heating, according to standard ISO 11357-3. The heating and cooling rate is 20° C./min.

The invention claimed is:

1. A process for manufacturing a structural or semi-structural composite part which may be in complex form, comprising a fibrous reinforcement and a thermoplastic polymer matrix, wherein the process comprises:
   i) depositing said fibrous reinforcement, which may be in the form of a preform, in a mold comprising two parts, one part being fixed and one mobile, with leaktight closure of said mold by means of a seal compressible by placing said mold under vacuum by means of a vacuum device, the partial pressure in the mold ranging from 1 to 10 mbar, said mold having no vent,
   ii) filling said closed mold thus under vacuum by injecting, in the molten state, onto said reinforcement in the dry state a pre-metered amount, just necessary to obtain the final part, of a two-component reactive system, which is the precursor of said thermoplastic polymer, based on a reactive thermoplastic prepolymer it being possible for the mold to be maintained under isothermal conditions at a temperature below the injection temperature and with said injection being carried out using an injection device comprising two distinct compartments for each of the two reactive components in the molten state, said reactive components being mixed before injection in the chamber of a static mixer head with a residence time in said chamber of less than 2 minutes, at a temperature which ranges from 180° C. to 400° C., with impregnation of said fibrous reinforcement and simultaneous reaction following the impregnation of said two-component reactive system under a pressure of less than 1 mbar, the creep of the resin through the reinforcement being accompanied by a compacting pressure at the end of injection ensuring complete filling of said mold, with no vent,
   iii) removing said part from the mold without any finishing treatment.

2. The process of claim 1, wherein the process further comprises, after step ii), a step of overmolding by separate injection onto the part formed and still in the mold of step ii), of a thermoplastic polymer in the molten state comprising short or long reinforcing fibers with an L/D aspect ratio of less than 1000, said polymer being used here in the form of granules, before it is melted, and already containing said reinforcing fibers, said thermoplastic being compatible with the polymer resulting from said reactive prepolymer-based two-component reactive system.

3. The process of claim 1, wherein the part of step ii) is part of a complex part comprising other constituent parts which are attached to one another and of different nature and which are chosen from plastic and/or metallic parts and that said process is part or constitutes a step of a process for molding by "in-mold" assembly of said constituent parts in the same mold or in a different mold so as to form said final complex part.

4. The process of claim 1, wherein said fibrous reinforcement is in the form of a preform, produced in a step prior to the molding of the composite part by forming of said preform, with this preform optionally being produced in the same mold by compression-molding of said reinforcement pre-impregnated with a polymer binder compatible with the polymer resulting from said prepolymer-based two-component reactive system, or with the same two-component reactive system, or said preform being produced by thermoforming in a different mold.

5. The process of claim 1, wherein the viscosity of said two-component reactive system as injected at the outlet of the head of said static mixer is less than 50 Pa·s.

6. The process of claim 1, wherein said two-component reactive system comprises at least one reactive thermoplastic prepolymer, bearing two identical functions (not reactive with one another) and at least one nonpolymeric chain extender bearing two identical functions (not reactive with one another) reactive with those of said reactive prepolymer.

7. The process of claim 1, wherein said two-component reactive system comprises at least one first reactive prepolymer, bearing two identical functions (not reactive with one another) and at least one second reactive prepolymer, bearing two identical functions (not reactive with one another) reactive with those of said first reactive prepolymer by polyaddition or by polycondensation.

8. The process of claim 1, wherein said polymer of said thermoplastic matrix is semi-crystalline, having a glass transition temperature Tg above 90° C., and a melting temperature Tm below 320° C.

9. The process of claim 2, wherein said overmolding thermoplastic polymer is semi-crystalline and has a melting temperature above 200° C.

10. The process of claim 1, wherein the said reactive prepolymer is polyamide.

11. The process of claim 1, wherein the said residence time in said static mixer is less than 10 s.

12. The process of claim 8, wherein the said Tg is higher than 100° C. and said Tm is between 200 and 280° C.

13. The process of claim 12, wherein said thermoplastic matrix is a semi-crystalline polyamide.

* * * * *